(12) United States Patent
Francis

(10) Patent No.: US 7,651,564 B2
(45) Date of Patent: Jan. 26, 2010

(54) GYPSUM-BASED FLOOR UNDERLAYMENT

(75) Inventor: Hubert C. Francis, Lithonia, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 12/100,507

(22) Filed: Apr. 10, 2008

(65) Prior Publication Data

US 2009/0255443 A1 Oct. 15, 2009

(51) Int. Cl.
*C04B 28/14* (2006.01)
*C04B 7/13* (2006.01)
*C04B 11/00* (2006.01)
*C04B 11/28* (2006.01)
*C04B 18/06* (2006.01)

(52) U.S. Cl. .................. 106/708; 106/695; 106/778; 106/785

(58) Field of Classification Search .................. 106/708, 106/778, 785, 695
See application file for complete search history.

(56) References Cited

U.S. PATENT DOCUMENTS

| | | | |
|---|---|---|---|
| 3,236,509 A | 2/1966 | Blair | |
| 3,307,840 A | 3/1967 | Conroy, Jr. | |
| 4,101,630 A | 7/1978 | Stiling | |
| 4,533,528 A | 8/1985 | Zaskalicky | |
| 4,661,159 A | 4/1987 | Ortega et al. | |
| 5,424,099 A | 6/1995 | Stewart et al. | |
| 5,439,518 A | 8/1995 | Francis et al. | |
| 5,573,588 A * | 11/1996 | Carrasquillo | 106/705 |
| 5,578,122 A * | 11/1996 | Carrasquillo | 106/709 |
| 5,685,903 A | 11/1997 | Stav et al. | |
| 5,718,759 A | 2/1998 | Stav et al. | |
| 5,734,954 A | 3/1998 | Eklund et al. | |
| 6,083,465 A | 7/2000 | Piasecki et al. | |
| 6,641,658 B1 * | 11/2003 | Dubey | 106/705 |
| 6,869,474 B2 * | 3/2005 | Perez-Pena et al. | 106/727 |
| 7,056,964 B2 | 6/2006 | Lettkeman et al. | |

FOREIGN PATENT DOCUMENTS

EP 28871 A * 5/1981
WO WO88/01257 2/1988

OTHER PUBLICATIONS

Derwent Patent Abstract No. 1989-251089, abstract of Hungarian Patent Specification No. HU 48910 T (Jul. 28, 1989).*

* cited by examiner

*Primary Examiner*—Anthony J Green
(74) *Attorney, Agent, or Firm*—Joel T. Charlton

(57) ABSTRACT

A flooring composition for mixing with water to produce a self-leveling slurry that quickly hydrates to form a high strength floor underlayment comprising a dry mixture of (1) beta gypsum produced by a continuous method; (2) Class C fly ash; (3) a conventional water reducing aid such as sulfonated melamines, sulfonated naphthalenes and their related formaldehyde condensates, and (4) a conventional set retarder.

8 Claims, No Drawings

GYPSUM-BASED FLOOR UNDERLAYMENT

BACKGROUND OF THE INVENTION

1. Field of the Invention

The present invention describes a formulation that when mixed with water to produce a self-leveling slurry quickly hydrates to form a high strength floor underlayment. The formulation is characterized by the inclusion of calcined gypsum of the beta (β) form, i.e., beta calcium sulfate hemihydrate (or beta gypsum), made by a continuous calcination process.

2. Description of Related Art

U.S. Pat. No. 4,661,159 describes a composition for producing a floor underlayment that includes an alpha calcium sulfate hemihydrate (alpha gypsum), Portland cement, fly ash, and a beta calcium sulfate hemihydrate (beta gypsum). The composition may also include a small amount of a retarder, defoamer, and superplasticizer and is mixed with water and sand to produce a pourable, self-leveling and quick-setting slurry. A preferred formulation is said to contain 45%-55% by weight beta gypsum; 20% to 30% by weight alpha gypsum; about 5% fly ash by weight; and about 20% Type II Portland Cement by weight. The method by which the beta gypsum is prepared is not discussed.

In U.S. Pat. No. 5,424,099 the combination of a hydraulic cement, 10 to 20% by wt., such as Portland cement, alumina cement, fly ash, blast furnace slag and silica fume; alpha calcium sulfate hemihydrate (alpha gypsum) 70 to 90% by wt., along with a superplasticizer is purportedly used as a self-leveling floor underlayment. Exemplary superplasticizers include naphthalene sulfonates; naphthalene sulfonate-formaldehyde condensates; calcium lignosulfonate; melamine sulfonate-formaldehyde condensates; and polycarboxylic acids.

U.S. Pat. No. 5,439,518 describes a composition based on a lime-containing fly ash that also can be formulated for floor underlayment applications. In the floor underlayment application, the ingredients include about 10-89 wt. % of a lime-containing fly ash, preferably 45 to 54 wt. %; about 10-89 wt. % hydratable gypsum, preferably 45-54 wt. % and at least about 0.05 wt. % of an additive selected from: a setting retarder, dispersant, and/or pigment. The patent suggests that alpha gypsum hemihydrate and beta gypsum hemihydrate can be used interchangeably without significantly impacting the properties of the resulting set product, although alpha hemihydrate is preferred from a commercial perspective. Again, the method by which the beta gypsum is prepared is not discussed.

In U.S. Pat. No. 5,685,903 and U.S. Pat. No. 5,718,759 a composition, also identified as being useful for a floor underlayment, is described containing about 20 wt. % to about 75 wt. % calcium sulfate beta-hemihydrate (beta gypsum), preferably 30 to 50 wt. %; about 10 wt. % to about 50 wt. % Portland cement, preferably 6 to 25 wt. %; about 4 wt. % to about 20 wt. % silica fume, preferably 4 to 8 wt. %; and about 1 wt. % to about 50 wt. % pozzolanic aggregate, preferably 1 to 15 wt. %. The Portland cement component may also be a blend of Portland cement with fly ash and/or ground blast slag. Nothing is disclosed about the source of the beta gypsum.

More recently, U.S. Pat. No. 7,056,964 proposed a composition useful for preparing a floor underlayment containing about 50 wt. % to about 98 wt. % calcium sulfate hemihydrate, at least 25% being calcium sulfate beta-hemihydrate (beta gypsum); about 0.05 wt. % to about 50 wt. % of an enhancing component, such as Portland cement, fly ash, blast furnace slag and silica fume; and a polycarboxylate dispersant comprising a copolymer of an oxyalkylene-alkyl ether and an unsaturated dicarboxylic acid. The invention was purportedly based on the patentee's observation that the fluidity of conventional dispersants, such as sulfonated melamines and sulfonated naphthalenes was not sufficient to permit the substitution of beta gypsum for alpha gypsum in high strength flooring applications, a result permitted only by the use of the more expensive polycarboxylate dispersants comprising a copolymer of an oxyalkylene-alkyl ether and an unsaturated dicarboxylic acid. The patent also indicates that continuously calcined synthetic gypsum is equivalent to beta-calcined hemihydrate.

SUMMARY OF THE INVENTION

In one embodiment, the present invention relates to a dry blend of ingredients to be mixed with water to form a self-leveling slurry that hydrates to form a high strength flooring comprising:
(1) about 50 to 90% by weight of continuous beta gypsum;
(2) about 10 to 40% by weight of Class C fly ash
(3) about 0.01 to 10% by weight of a dispersing agent selected from the group consisting of sulfonated melamines, sulfonated naphthalenes, naphthalene sulfonate-formaldehyde condensates; melamine sulfonate-formaldehyde condensates and mixtures thereof; and
(4) about 0.02 to 1% by weight of a set retarder.

In one embodiment, the present invention relates to a dry blend of ingredients to be mixed with water to form a self-leveling slurry that hydrates to form a high strength flooring, consisting essentially of:
(1) about 50 to 90% by weight of continuous beta gypsum;
(2) about 10 to 40% by weight of Class C fly ash
(3) about 0.01 to 10% by weight of a dispersing agent selected from the group consisting of sulfonated melamines, sulfonated naphthalenes, naphthalene sulfonate-formaldehyde condensates; melamine sulfonate-formaldehyde condensates and mixtures thereof; and
(4) about 0.02 to 1% by weight of a set retarder.

DETAILED DESCRIPTION OF THE INVENTION

The present invention combines (1) beta gypsum produced by a continuous method with (2) Class C fly ash (3) conventional water reducing aids such as sulfonated melamines, sulfonated naphthalenes and their related formaldehyde condensates and (4) conventional set retarders to produce a formulation that when mixed with water to produce a self-leveling slurry quickly hydrates to form a high strength floor underlayment.

In particular, the present invention provides a dry blend of ingredients to be mixed with water to form a self-leveling slurry that hydrates to form a high strength flooring, comprising:
(1) about 50 to 95% by weight of continuous beta gypsum;
(2) about 10 to 40% by weight of Class C fly ash
(3) about 0.01 to 10% by weight of a dispersing agent selected from the group consisting of sulfonated melamines, sulfonated naphthalenes, naphthalene sulfonate-formaldehyde condensates; melamine sulfonate-formaldehyde condensates and mixtures thereof; and
(4) about 0.02 to 1% by weight of a set retarder.

The present invention is based on applicant's discovery that by adding a significant amount of Class C fly ash to a floor underlayment formulation one reduces the water demand of the formulation to such an extent, even when using beta gypsum prepared by the continuous process, that one can: (1) avoid the need for any significant amount of alpha gypsum in the formulation and (2) instead of requiring the polycarboxylate superplasticizers of U.S. Pat. No. 7,056,964, one can instead use only conventional water reducing aids such as sulfonated melamines, sulfonated naphthalenes and their formaldehyde condensates at conventional use levels.

Commercial calcined gypsum is available in basically two crystal forms, alpha calcium sulfate hemihydrate (alpha gypsum) and beta calcium sulfate hemihydrate (beta gypsum).

Beta calcium sulfate hemihydrate (beta gypsum) is made by calcining gypsum (i.e., calcium sulfate dihydrate) at atmospheric pressure. The processing produces an acicular crystal structure (elongated crystals). This acicular crystal structure adversely influences the packing efficiency of the beta gypsum crystals and this tends to limit the ultimate strength developed in products made from beta gypsum.

Alpha gypsum is made by calcining the gypsum (calcium sulfate dihydrate) at an elevated pressure, making it more costly and generally less available than beta gypsum. As a consequence of this processing, crystals of alpha-calcined gypsum tend to be less acicular than beta-calcined gypsum crystals. This crystal structure allows water to flow more easily between the crystals, thus requiring less water to form a flowable slurry. As a result, alpha gypsum crystals are able to pack more tightly together, generally resulting in a denser and stronger set plaster than usually obtained from beta gypsum.

Historically, alpha calcium sulfate hemihydrate (alpha gypsum) has been widely used in floor underlayment applications because of its lower water demand or consistency, typically requiring 25 to 45 parts water per 100 parts calcined gypsum, and its higher set strength and hardness.

As used throughout this application, the phrase "water demand" (alternatively referred to in the prior art as dispersed consistency or simply consistency) refers to the amount of water that must be added to a formulation containing the particular calcium sulfate hemihydrate (i.e., calcined gypsum) to fluidize the formulation containing the calcined gypsum and to obtain a desired or proper flow of the gypsum slurry. Stated in another more quantitative way, the water demand of a calcined gypsum is the water volume required to give a standard viscosity or flow when a standard amount by weight of calcined gypsum is dispersed by mechanical mixing in a laboratory mixer at high shear intensity and for a standard time. Water demand or consistency is generally specified on a mass of water per mass of calcined gypsum basis for a common (i.e., fixed) measurement of fluidity.

Because of its acicular crystal structure, beta calcined gypsum has a higher water demand than alpha gypsum, requiring more water to fluidize the calcined gypsum to the same extent. Even in beta gypsums, however, there is a variation in the water demand of the calcined gypsum depending on whether the gypsum has been made by a batch process or by a continuous process.

A characteristic of beta gypsum produced by a continuous process is that the continuous beta gypsum has a significantly higher water demand than beta gypsum produced by the conventional batch process (hereafter batch beta gypsum and sometimes referred to in the art as bag plaster, or bag stucco). Continuous beta gypsum is widely used in making conventional gypsum wallboards and thus is commonly referred to as wallboard grade calcined gypsum. Batch beta gypsum is used in molding applications and is often referred to as molding plaster. While batch beta gypsum has occasionally been suggested for floor underlayment applications, the only reference to the potential use of a continuous beta gypsum in a floor underlayment formulation is in U.S. Pat. No. 7,056,964 mentioned above. As described, the use of a beta gypsum is facilitated by use of the more expensive polycarboxylate dispersants comprising copolymers of an oxyalkylene-alkyl ether and an unsaturated dicarboxylic acid.

As an example, the water demand of a continuous gypsum, i.e., the amount of water required to fluidized a continuous beta gypsum, is typically about 17 to 21% higher than the water demand of a batch beta gypsum, i.e., the amount of water required to fluidized a batch beta gypsum to the same degree. For this reason, to the extent beta gypsum has been used in floor underlayment applications, batch beta gypsum or bag plaster has conventionally been used to prepare mixes in such instances. Prior to the present invention, and notwithstanding the passing reference in the aforementioned '964 patent, applicant is unaware of any actual use of continuous beta gypsum for floor underlayment applications.

The higher water demand of continuous beta gypsum is generally thought to be due to its wide particle size distribution and highly fractured and fissured structure relative to batch beta gypsum. In any event, until applicant discovered that the inclusion of a significant amount of Class C fly ash in a formulation with continuous beta gypsum resulted in a significant reduction in water demand, the increased water demand characteristic of continuous beta gypsum had been a significant impediment to its use for floor underlayment applications.

Thus, a key feature of the present invention involves the use of beta gypsum produced by a continuous method (continuous beta gypsum) to produce a dry mix formulation that when mixed with water to produce a self-leveling slurry quickly hydrates to form a high strength floor underlayment.

The principal constituent of the flooring formulation of the present invention is a continuous beta gypsum, i.e., beta calcium sulfate hemihydrate, made by the continuous calcination of gypsum (calcium sulfate dihydrate) at atmospheric pressure. The continuous beta gypsum constitutes at least 55% by weight and up to 90% by weight of the dry blend of ingredients making up the flooring formulation of the present invention. Usually, the formulation will contain at least 60% by weight continuous beta gypsum.

The prior art provides a wide array of equipment and methods for continuously calcining gypsum at atmospheric pressure to produce continuous beta gypsum. In this regard, the following references can be mentioned, U.S. Pat. Nos. 3,236,509; 3,307,840; 4,101,630; 4,533,528; 5,743,954; and 6,083,465 and published PCT application WO88/01257.

These and other continuous calcination procedures and apparatus can be used for producing the continuous beta gypsum used in the flooring formulation of the present invention. The present invention is not limited to any particular source of the continuous beta gypsum. As noted above, continuous beta gypsum differs from batch beta gypsum (bag plaster), i.e., beta calcium sulfate hemihydrate made by atmospheric pressure batch calcination, in having an inherently higher water demand or consistency. Whereas batch beta gypsum generally has a consistency of about 64 to 68, the water demand or consistency of continuous beta gypsum is generally about 17 to 21 percent higher, typically exhibiting a water demand or consistency of about 75 to 82.

In large part because of this higher water demand (consistency), continuous beta gypsum, while used extensively for making gypsum wallboard (sheet rock or drywall), simply has not been used in floor underlayment formulations. In accordance with the present invention, however, building on the discovery that upon the addition of a significant quantity of Class C fly ash to continuous beta gypsum, the water demand (consistency) of formulation containing continuous beta gypsum is reduced sufficiently to make flooring formulations based on continuous beta gypsum commercially competitive both with prior art formulations using alpha gypsum, and with prior art formulations that require the more expensive superplasticizers based on copolymers of an oxyalkylene-alkyl ether and an unsaturated dicarboxylic acid.

The other critical component of the flooring formulation of the present invention is Class C fly ash. Fly ash is one of the waste products or residues produced by burning coal. Two of the common constituents of fly ash are silica, alumina and lime. ASTM C618 defines two classes of fly ash: Class F fly ash, usually derived from the burning of anthracite or bituminous coal and Class C fly ash, usually derived from the burning of lignite or subbituminous coal. Class F fly ash is pozzolanic, contains less than 10% lime, and has little or no cementacious properties on its own. Class C fly ash contains more than 20% lime and has self-cementing properties as well as pozzolanic properties.

As used herein, the phrase Class C fly ash is intended to embrace any fly ash that has more than 20% lime (either as produced or as modified through the subsequent addition of lime) and has self-cementing properties as well as pozzolanic properties.

Flooring formulations of the present invention contain at least 10% by weight Class C fly ash and up to about 40% Class C fly ash. Usually, the flooring formulation will contain between 15% and 30% by weight Class C fly ash. In effect, applicant has determined that Class C fly ash acts as somewhat of a surrogate for alpha gypsum in the flooring formulation.

The next required component of the flooring formulation of the present invention is a dispersing agent. Such materials are also known in the art as water reducing aids and superplasticizers. As noted above, an important feature of the present invention is that the flooring composition of the present invention, even though based on the inherently higher water demand (consistency) continuous beta gypsum as its principal constituent, exhibits a commercially acceptable flowability without the need for the more expensive superplasticizers, such as those based on copolymers of an oxyalkylene-alkyl ether and an unsaturated dicarboxylic acid. Instead, the flooring formulation of the present invention uses conventional dispersing agents such as sulfonated melamines, sulfonated naphthalenes, naphthalene sulfonate-formaldehyde condensates; melamine sulfonate-formaldehyde condensates and mixtures thereof. LOMAR D, available from Geo Specialty Chemicals is a particularly suitable water reducing agent or dispersing agent condensates; melamine sulfonate-formaldehyde condensates and mixtures thereof. LOMAR D is a highly polymerized naphthalene sulfonate and is available as a fine tan powder easily dispersed in water.

The water reducing aid or dispersing agent is present in the formulation in an amount of about 0.01 to 10%, preferably in an amount of 0.05 to 1% and usually is present in an amount of 0.1 to 0.4% by weight.

The final necessary component of the flooring formulation of the present invention is a set retarder. A set retarder is present in the mix of dry ingredients in an amount of 0.02 to 1% by weight, usually from about 0.05 to 0.3%. The presence of a set retarder insures that the aqueous slurry made by blending the flooring formulation with water has a suitable working time before it sets. With the presence of the set retarder, the formulation can be properly mixed with water and the resulting slurry distributed to the application area of a job site without premature setting. Conventional gypsum setting retarders, such as sodium citrate and commercially available proteinaceous retarders are suitable for use in the mixture of the present invention. A preferred retarder is sodium citrate because it can be used very effectively in small amounts as compared to other retarders without adversely affecting desired characteristics of the set composition.

In addition to these necessary constituents, the flooring formulation of the present invention may also include as optional ingredients a small amount of a calcium aluminate cement, such as Fondu cement or Portland cement and a small amount of alpha gypsum. These ingredients can be added to help control the setting rate (set control, or set stabilization) and to improve the strength of the set composition.

Fondu cement is a dark grey calcium aluminate cement. It provides rapid hardening, high strength and high resistance to the corrosive effects of salt water, mineral sulfates and many other forms of chemical attack which can often affect Portland cements. Portland cements represent a less preferred class of hydraulic cements that contain a substantial quantity of calcium silicate with minor quantities of aluminates, namely, tricalcium aluminate and a calcium aluminoferrite. As known to those skilled in the art, Portland cements are produced by heating, to incipient fusion, an intimate mixture of calcareous and argillaceous, or other siliceous, aluminous, and iron-oxide-bearing materials so as to form a clinker. The clinker then is pulverized and a small amount of calcium sulphate, usually gypsum, is added to improve the setting characteristics of the finished cement. With respect to a Portland cement, a sulfate resistant cement, such as Type V Portland cement, is usually be preferred.

When used, each of these ingredients, i.e., the calcium aluminate cement and/or alpha gypsum may be added separately in an amount of up to about 15% by weight of the fully formulated composition.

Usually, the flooring composition of the present invention will be mixed with water and with an aggregate such as sand and the resulting slurry will be deposited on a conventional plywood subfloor. Any kind of mixing apparatus may be used to combine the components to make the slurry. As understood by those skilled in the art a wide variety of sands can be used. A suitable sand will have a particle size distribution such that all particle pass through a No. 4 Sieve (U.S. Standard Series) and will generally be retained by a No. 100 sieve (see ASTM C 35). Depending on the specific application, a coarser or finer sand may be desired. A coarse sand may have a median particle size within the range of about 600 to 1000 microns, while a fine sand may have a median particle size within the range of about 250 to 600 microns.

Usually, the weight ratio of sand to the dry blend of ingredients constituting the flooring composition is from about 2.8:1 to 1.75:1, preferably about 2.25:1. The aggregate and the flooring composition are added to water separately and are mixed thoroughly to produce a homogeneous slurry. The amount of water to be used is a sufficient amount to provide a pumpable, self-leveling slurry having a characteristic "flowability." Usually from about 16 parts by weight up to about 22 parts by weight water per 100 parts by weight of the mixture of the aggregate (e.g., sand) and the dry blend of the flooring composition should be sufficient to provide the necessary flowability. The flooring underlayment mixture can be pumped through a hose to the room where the flooring underlayment is to be applied. Once the slurry has been poured, the composition should be allowed to harden. Once the floor has hardened sufficiently, carpet, linoleum, tile, wood, or other such floor coverings may be installed.

The following non-limiting example further illustrates the invention.

EXAMPLE

A dry blend of ingredients suitable for mixing with water to produce a set floor underlayment composition can be prepared from the following proportion of ingredients:

| Ingredients | Amount (dry weight percent) |
| --- | --- |
| Continuous beta gypsum | 60.7 |
| Class C fly ash | 20.0 |
| LOMAR D | 0.2 |
| Sodium citrate | 0.1 |
| Alpha gypsum | 14 |
| Calcium Aluminate cement | 5.0 |

The dry blend of ingredients along with a sand (the weight ratio of sand to the dry blend of ingredients being 2.25:1) are mixed with water in an amount of 19 parts per 100 parts total solids to produce a self-leveling slurry.

The formulation (neat plaster without added aggregate) typically yields a set composition having a compressive strength of 5,000 to 7,500 psi.

The present invention has been described with reference to specific embodiments for the purpose of describing, but not limiting the invention. Various modifications, which will become apparent to one skilled in the art, and the invention is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%

What is claimed is:

1. A dry blend of ingredients to be mixed with water to form a self-leveling slurry that hydrates to form a high strength flooring comprising:
   (1) about 50 to 90% by weight of continuous beta gypsum hemihydrate;
   (2) about 10 to 40% by weight of Class C fly ash
   (3) about 0.01 to 10% by weight of a dispersing agent selected from the group consisting of sulfonated melamines, sulfonated naphthalenes, naphthalene sulfonate-formaldehyde condensates; melamine sulfonate-formaldehyde condensates and mixtures thereof; and
   (4) about 0.02 to 1% by weight of a set retarder.

2. The dry blend of ingredients of claim 1 wherein the set retarder is sodium citrate.

3. The dry blend of ingredients of claim 1 containing alpha gypsum hemihydrate in an amount of up to 15% by weight.

4. The dry blend of ingredients of claim 1 containing calcium aluminate cement in an amount of up to 15% by weight.

5. A dry blend of ingredients to be mixed with water to form a self-leveling slurry that hydrates to form a high strength flooring, consisting essentially of:
   (1) about 50 to 90% by weight of continuous beta gypsum hemihydrate;
   (2) about 10 to 40% by weight of Class C fly ash
   (3) about 0.01 to 10% by weight of a dispersing agent selected from the group consisting of sulfonated melamines, sulfonated naphthalenes, naphthalene sulfonate-formaldehyde condensates; melamine sulfonate-formaldehyde condensates and mixtures thereof; and
   (4) about 0.02 to 1% by weight of a set retarder.

6. The dry blend of ingredients of claim 5 wherein the continuous beta gypsum hemihydrate is present in an amount of at least 60% by weight.

7. The dry blend of ingredients of claim 6 wherein the Class C fly ash is present in an amount of between 15 and 30 by weight.

8. The dry blend of ingredients of claim 7 wherein the dispersing agent is present in an amount of 0.05 to 1% by weight.

* * * * *